United States Patent
Kitagawa et al.

(10) Patent No.: US 6,997,167 B2
(45) Date of Patent: Feb. 14, 2006

(54) FUEL INJECTION CONTROL SYSTEM FOR ENGINE

(75) Inventors: Yuichi Kitagawa, Numazu (JP); Kazuyoshi Kishibata, Numazu (JP); Hiroyasu Sato, Numazu (JP); Akira Shimoyama, Numazu (JP)

(73) Assignee: Kokusan Denki Co., Ltd., Shizuoka-ken (JP)

( * ) Notice: Subject to any disclaimer, the term of this patent is extended or adjusted under 35 U.S.C. 154(b) by 0 days.

(21) Appl. No.: 11/000,797

(22) Filed: Dec. 1, 2004

(65) Prior Publication Data

US 2005/0133011 A1 Jun. 23, 2005

(30) Foreign Application Priority Data

Dec. 12, 2003 (JP) .............................. 2003-415107

(51) Int. Cl.
*F02M 51/00* (2006.01)
(52) U.S. Cl. ....................... 123/492; 123/480
(58) Field of Classification Search ................ 123/492, 123/493, 480, 494; 701/110
See application file for complete search history.

(56) References Cited

U.S. PATENT DOCUMENTS

| 6,055,948 | A | * | 5/2000 | Shiraishi et al. ......... 123/90.15 |
| 6,223,730 | B1 | * | 5/2001 | Hasegawa et al. ......... 123/491 |
| 6,550,457 | B1 | * | 4/2003 | Kitagawa et al. ........... 123/486 |
| 6,814,050 | B2 | * | 11/2004 | Kishibata et al. ........... 123/332 |
| 2003/0062028 | A1 | * | 4/2003 | Kitagawa et al. ........... 123/486 |
| 2004/0094120 | A1 | * | 5/2004 | Kishibata et al. ........... 123/325 |

FOREIGN PATENT DOCUMENTS

| JP | 2001-336439 | 12/2001 |
| JP | 2002-364409 | 12/2002 |

\* cited by examiner

*Primary Examiner*—John T. Kwon (74) *Attorney, Agent, or Firm*—Pearne & Gordon LLP (57) ABSTRACT

A fuel injection control system for an engine comprising: accelerating/decelerating state detection means which samples an intake pipe pressure of the engine at each sample timing which comes every time a very short time is passed from a timing at which a signal generator generates a signal at a reference crank angle position of the engine, and detects whether the engine is in an accelerating state or in a decelerating state when a difference between the intake pipe pressure sampled at each sample timing and an intake pipe pressure sampled at the corresponding sample timing one combustion cycle before exceeds a set value; and injector drive means which decides a fuel amount to be injected from an injector so as to be suitable for the detected state when the accelerating state or decelerating state is detected and drives the injector so as to inject the decided amount of fuel.

28 Claims, 6 Drawing Sheets

FUEL INJECTION CONTROL SYSTEM FOR ENGINE

TECHNICAL FIELD OF THE INVENTION

The present invention relates to a fuel injection control system for an engine which controls a fuel amount injected from an injector into the engine.

BACKGROUND OF THE INVENTION

In an internal combustion engine performing a fuel injection control by an electronic control unit (ECU), it is necessary to estimate an amount of air having flowed into each cylinder of the engine, in order to determine an amount of fuel to be injected from the injector. One of known ways to determine an air inflow into each cylinder is a D-jetronic method (a speed density method) which estimates the air inflow from a pressure (a negative pressure) within an intake pipe and a rotational speed of the engine.

In the situation that a throttle valve is abruptly operated, such as the case where a driver abruptly opens the throttle valve to accelerate the engine or the case where the driver abruptly closes the throttle valve to decelerate the engine, air-fuel ratio deviates from a suitable value because of a delay in response of an intake air drawn to the engine when a fuel of an arithmetically operated amount relative to the air inflow estimated from the intake pipe pressure and the rotational speed of the engine is supplied to the engine. If the engine is accelerated, the air-fuel ratio becomes too lean. On the other hand, if the engine is decelerated, the air fuel ratio becomes too rich. As a result, an exhaust gas composition may deteriorate, and so may deteriorate an operating performance of the engine, at the time of accelerating or decelerating the engine.

Therefore, when the throttle valve is abruptly performed in order to accelerate or decelerate the engine, the deterioration of the exhaust gas composition and the deterioration of the operating performance of the engine are prevented by correction to increase or decrease a fuel injection amount according to a changing amount of an opening degree of the throttle valve.

As a method for detecting an operation amount of the throttle valve, a throttle position sensor for detecting a position of the throttle valve is generally used; however, for reducing the cost, the throttle position sensor is not installed in many cases. In this case, it is required to detect the acceleration and deceleration of the engine without using the throttle position sensor.

As a method for detecting the acceleration and deceleration of the engine without using the throttle position sensor, there has been proposed a method for detecting an accelerating state or decelerating state of the engine when the intake pipe pressure is changed with a predetermined amount, as described in Japanese Patent Application Laid-Open No. 2002-242749.

In the method described in Japanese Patent Application Laid-Open No. 2002-242749, a plurality of crank angle positions of a crankshaft are predetermined in advance to be sampling positions for sampling intake pipe pressures, and each intake pipe pressure newly sampled at each sampling position is compared with a previous intake pipe pressure sampled at the same sampling position one combustion cycle before. Then, it is determined that the engine is in accelerating state when the newly sampled intake pipe pressure is higher by at least a predetermined level than the previously sampled intake pipe pressure and that the engine is in decelerating state when the newly sampled intake pipe pressure is lower by at least a predetermined level than the previously sampled intake pipe pressure.

Figure 6A:
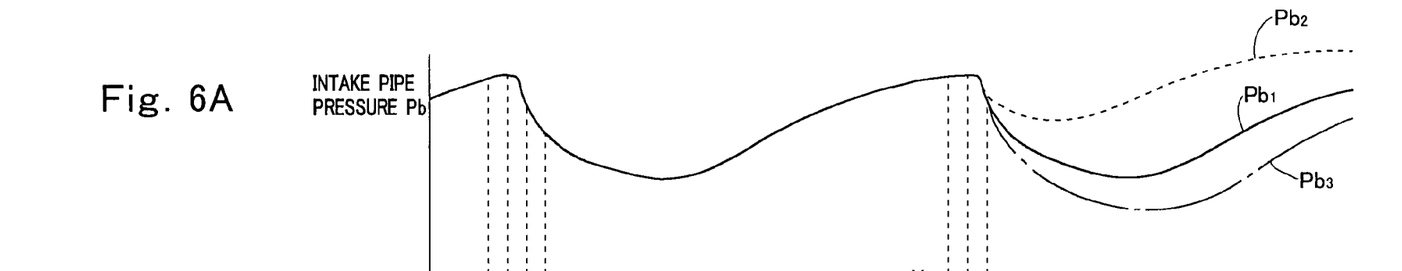

A curve "Pb1" represented in a solid line in FIG. 6A shows variations of the intake pipe pressure in a steady state in which a four-stroke internal combustion engine is running at a substantially constant rotational speed. By contrast, a curve Pb2 represented in a broken line shows variations of the intake pipe pressure in an abruptly accelerating operation by opening the throttle valve at the position of a crank angle θ1. Thus, when the engine is being accelerated, the opening of the throttle valve results in a pressure rise in the intake pipe. Therefore, the accelerating state of the engine can be determined by comparing the intake pipe pressure sampled at each sampling position with the previous intake pipe pressure sampled at the same sampling position one combustion cycle before, and then, by detecting that the newly sampled intake pipe pressure is higher by at least a predetermined level than the previously sampled intake pipe pressure. The degree of acceleration can be determined by the rate of variation over time of the difference between the newly sampled intake pipe pressure and the intake pipe pressure sampled at the same position one combustion cycle before.

A curve "Pb3" represented in a broken line in FIG. 6A shows variations of the intake pipe pressure when the throttle valve is closed to perform abrupt deceleration. As seen from the drawing, when the engine is being decelerated, the closing of the throttle valve (a decrease of the air inflow to the intake pipe) results in a pressure drop in the intake pipe. Therefore, the decelerating state of the engine can be determined by comparing the intake pipe pressure sampled at each sampling position with the previous intake pipe pressure sampled at the same sampling position one combustion cycle before, and then, by detecting that the newly sampled intake pipe pressure is lower by at least a predetermined level than the previously sampled intake pipe pressure. The degree of deceleration can be determined by the rate of variation over time of the difference between the newly sampled intake pipe pressure and the intake pipe pressure sampled at the same position one combustion cycle before.

Figure 6B:
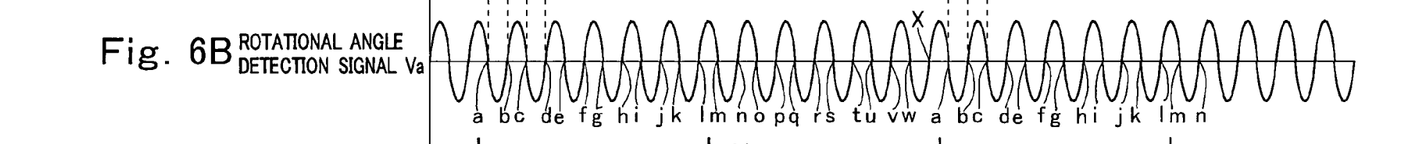
Figure 6C:
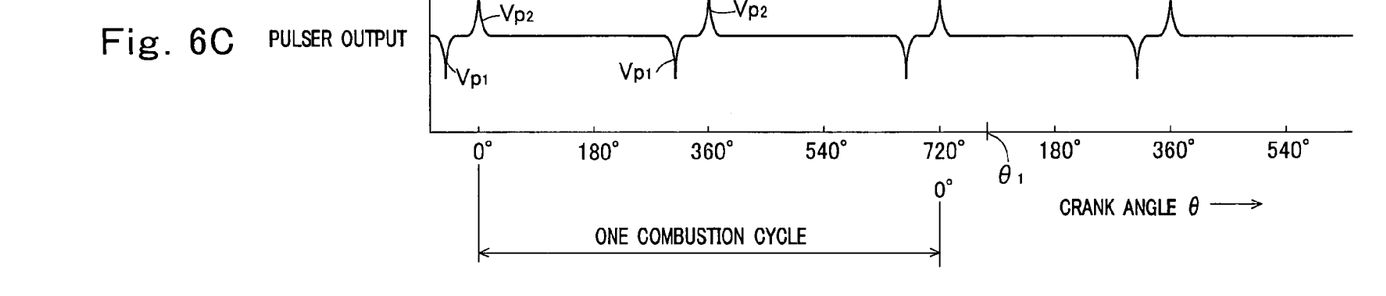

In the detecting method described in Japanese Patent Application Laid-Open No. 2002-242749, an AC voltage as shown in FIG. 6B, which is generated from a power generating coil inside of a magneto AC generator provided so as to rotate synchronously with the engine, is used as a rotational angle detection signal. Also, in this method, there is provided a signal generator which detects an edge of a reluctor provided on a rotor synchronously rotating with the engine and generates pulse signals Vp1 and Vp2 (FIG. 6C) at a specific crank angle position of the engine. The pulse signal Vp2 generated by the signal generator is specified as a reference crank angle signal, and a zero cross point of the rotational angle detection signal emerging immediately after the generation of the reference crank angle signal is specified as a sampling position "a". Zero cross points, each emerging during following combustion cycles, are specified as sampling positions b, c, ..., w, x, and the intake pipe pressure are sampled at these sampling positions (24 sampling positions in the drawing). In the shown example, a position where the reference crank angle signal Vp2 is generated is set at a position slightly advanced from a top dead center position at the time of starting a suction stroke. The top dead center position is a crank angle position when a piston of the engine reaches the top dead center.

According to the method for detecting acceleration/deceleration disclosed in Japanese Patent Application Laid-Open No. 2002-242749, it is possible to detect that the engine is in accelerating and in decelerating state without using the throttle position sensor. However, in the case where the determination of the accelerating/decelerating state is performed based on the sampled intake pipe pressure at each sampling position, the following problem occurs.

The intake pipe pressure abruptly decreases in the suction stroke, the minimum value is shown at the end of the suction stroke and the beginning of a compression stroke. After the minimum value of the intake pipe pressure is shown, the intake pipe pressure gradually increases until a point immediately before the next suction stroke. A degree of increase in an increasing process of the intake pipe pressure is controlled by the time constant decided by the opening degree of the throttle valve (an opening area) and volume inside of the intake pipe provided between the throttle valve and an intake valve (volume inside of the intake pipe on the downstream of the throttle valve). In the increasing process of the intake pipe pressure, since the intake valve is closed, the intake pipe pressure is not affected by a piston movement (the crank angle).

In addition, in the increasing process of the intake pipe pressure, the increasing speed of the intake pipe pressure becomes low when the opening degree of the throttle valve is small, since an amount of air flowing through the opening area of the throttle valve is little, and the increasing speed of the intake pipe pressure becomes high when the opening degree of the throttle valve is large, since the amount of air flowing through the opening area of the throttle valve is large. After the suction stroke is finished, the intake valve is closed in the increasing process of the intake pipe pressure; therefore, the intake pipe pressure is irrelevant to the crank angle. Because of the constant volume of the intake pipe, the intake pipe pressure after the suction stroke is determined by the opening area of the throttle valve and the elapsed time.

However, in the already proposed accelerating/decelerating state detection method, after the suction stroke is finished, the intake pipe pressure is sampled at the predetermined crank angle position which is used as the sampling position even in the increasing process of the intake pipe pressure. Accordingly, in a transient state where the rotational speed of the engine is changing, the intake pipe pressure sampled at each sampling position and the intake pipe pressure sampled at the same sampling position one combustion cycle before become unrelated as the object of comparison, which causes a problem that detecting accuracy for the accelerating/decelerating state becomes worsen.

SUMMARY OF THE INVENTION

An object of the present invention is to provide a fuel injection control system for an engine which can control a fuel injection amount so as to prevent deterioration of an exhaust gas composition and deterioration of operating performance of the engine by accurately detecting an accelerating and decelerating state of the engine even in a transient state where a rotational speed of the engine is changing, and by accurately correcting the fuel injection amount depending on the detected accelerating or decelerating state.

The present invention is applied to a fuel injection control system for an engine comprising: injection amount arithmetical operation means for arithmetically operating a basic injection amount relative to an intake air amount estimated from an intake pipe pressure of the engine and various control conditions; and injector drive means for driving an injector so as to inject a fuel amount determined based on the basic injection amount from the injector.

In the present invention, there are provided: a signal generator which generates a reference crank angle signal at a reference crank angle position, using a specific crank angle position of an engine as the reference crank angle position; and accelerating/decelerating state detection means which samples an intake pipe pressure of the engine at each sample timing which comes every time a very short time is passed from a timing at which the reference crank angle signal is generated, detects an intake pipe pressure difference which is a difference between the intake pipe pressure sampled at each sample timing and an intake pipe pressure sampled at the corresponding sample timing one combustion cycle before, and detects whether the engine is in an accelerating state or in a decelerating state when the intake pipe pressure difference exceeds a set value. And, the injector drive means is constituted so as to determine the fuel amount injected from the injector by correcting the basic injection amount to be matched with the detected state, when the accelerating state is detected and/or when the decelerating state of the engine is detected by the accelerating/decelerating state detection means.

As aforementioned, when each sample timing is determined by an elapsed time from a timing where the reference crank angle signal is generated, even in a transient state where a rotational speed of the engine is changing, it is possible to provide an appropriate corresponding relationship between a value of the intake pipe pressure newly sampled at a outside a suction stroke (a section where the intake pipe pressure is determined by an opening area of a throttle valve and the elapsed time) and a value sampled at the corresponding sample timing one combustion cycle before. Thus, in the case where a difference between an intake pipe pressure sampled at each sample timing and an intake pipe pressure sampled at the corresponding sample timing one combustion cycle before is detected as an intake pipe pressure difference, and where it is determined whether the engine is in an accelerating state or in a decelerating state when the intake pipe pressure difference exceeds the set value, the accelerating or decelerating state of the engine can be accurately detected even in the transient state where the rotational speed of the engine is changing.

Aforementioned accelerating/decelerating state detection means can be constituted so as to detect the accelerating state of the engine when the intake pipe pressure newly sampled at each sample timing is higher than that sampled at the corresponding sample timing one combustion cycle before and when the intake pipe pressure difference exceeds the set value, and to detect the decelerating state of the engine when the intake pipe pressure newly sampled at each sample timing is lower than that sampled at the corresponding sample timing one combustion cycle before and when the intake pipe pressure difference exceeds the set value.

BRIEF DESCRIPTION OF THE DRAWINGS

The above and other objects and features of the invention will be apparent from the detailed description of the preferred embodiment of the invention, which are described and illustrated with reference to the accompanying drawings, in which;

FIG. 3A to 3F are time charts showing a signal waveform of each part in FIG. 1 when an accelerating operation of an engine is started, a waveform of an intake pipe pressure, and an opening degree of a throttle valve;

FIG. 4A to 4E are time charts showing a waveform of a pulse which provides a start timing of a task for performing an accelerating/decelerating state detection process, a waveform of a crank angle signal produced by an output of a signal generator, a waveform of an injection command signal Vj, a wave form of the intake pipe pressure, and variations in the opening degree of the throttle valve, when the accelerating operation of the engine is performed in the embodiment of the invention;

FIG. 5A to 5E are time charts showing a waveform of a pulse which provides a start timing of a task for performing an accelerating/decelerating state detection process, a waveform of a crank angle signal produced by an output of a signal generator, a waveform of an injection command signal Vj, a wave form of the intake pipe pressure, and variations in the opening degree of the throttle valve, when the decelerating operation of the engine is performed in the embodiment of the invention; and FIG. 6A to 6C are time charts for explaining an accelerating/decelerating state detection method in a conventional fuel injection control system.

DETAILED DESCRIPTION OF PREFERRED EMBODIMENTS

A preferred embodiment of the present invention will be described with reference to the attached drawings. In the description below, it is assumed that an engine is a single-cylinder engine.

Figure 1:
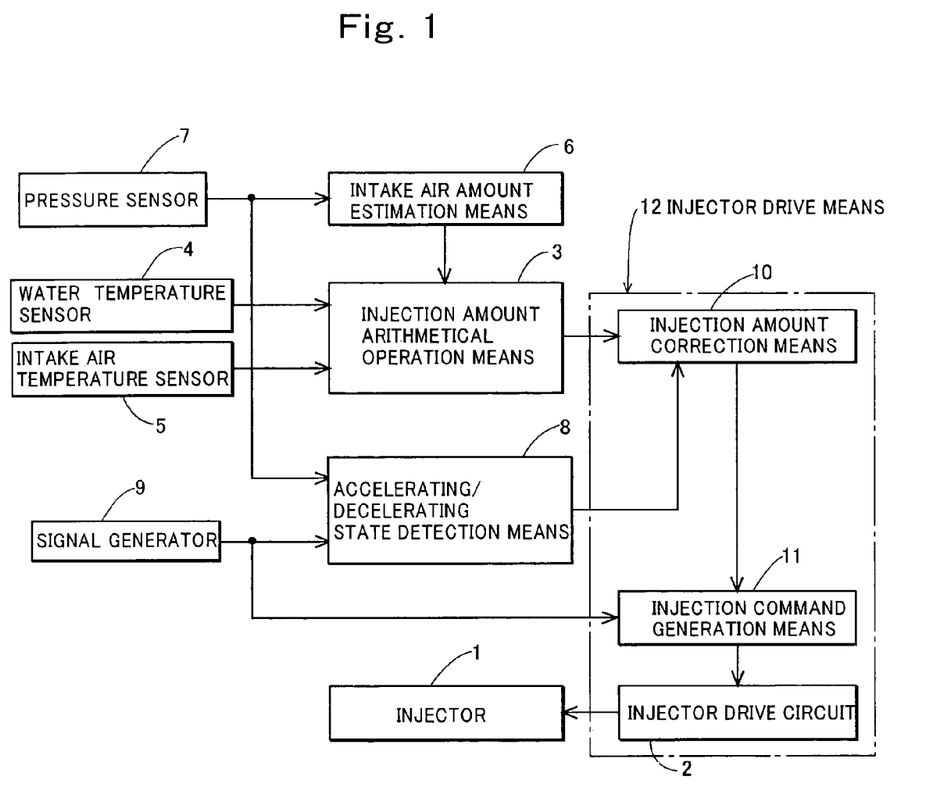
FIG. 1 is a block diagram of a construction of an embodiment of the present invention.

FIG. 1 is a block diagram showing a construction of a fuel injection control system used for performing a fuel injection control method according to a preferred embodiment of the invention. In FIG. 1, a reference numeral 1 denotes a fuel injector mounted on an intake pipe of an engine to inject a fuel into the intake pipe, 2 denotes an injector drive circuit which provides a drive current to the injector 1 while an injection command is given. The injector 1 opens its valve while the drive current is given and injects the fuel into the intake pipe of the engine.

An amount of fuel injected by the injector 1 is determined by the period of time for which the fuel is injected (a fuel injection time) and a pressure of fuel to be supplied to the injector. Generally, the fuel injection amount is controlled by the fuel injection time, since the pressure of fuel to be supplied to the injector is kept at a constant value.

A reference numeral 3 denotes injection amount arithmetical operation means which arithmetically operates, in a form of the fuel injection time, the fuel injection amount required for setting an air-fuel ratio to be a predetermined value relative to a cooling water temperature of the engine detected by a water temperature sensor 4, an intake air temperature of the engine detected by an intake air temperature sensor 5, and an intake air amount estimated by intake air amount estimation means 6. In this specification, the fuel injection amount thus operated is called a basic injection amount.

The intake air amount estimation means 6 estimates an amount of air having flowed into a cylinder of the engine using an intake pipe pressure (negative pressure) detected by a pressure sensor 7 and an volumetric efficiency of the engine.

A reference numeral 8 denotes accelerating/decelerating state detection means for detecting, by the accelerating/decelerating state detection method according to the present invention, whether the engine is in an accelerating state or in a decelerating state using an output of a signal generator 9 which generates a reference crank angle signal at a specific crank angle position of the engine and an output of the pressure sensor.

A reference numeral 10 denotes injection amount correction means for performing an arithmetical operation to correct the basic injection amount when the correction of the basic injection amount operated by the injection amount arithmetical operation means 3 is required. The injection amount correction means 10 corrects the injection amount by adding a correction amount or multiplying a correction coefficient to the basic injection amount operated by the injection amount arithmetical operation means 3 when the accelerating state of the engine is detected and/or when the decelerating state of the engine is detected by the accelerating/decelerating state detection means 8, and supplies the corrected injection amount to injection command generation means 11. When the accelerating/decelerating state of the engine is not detected, the injection amount correction means 10 does not perform the correction of the injection amount; therefore, the basic injection amount arithmetically operated by the injection amount arithmetical operation means 3 is supplied to the injection command generation means 11.

The injection command generation means 11 supplies an injection command signal having a rectangular waveform to the injector drive circuit 2 when the signal generator 9 generates the reference crank angle signal. The injection command signal has a signal width required for injecting fuel of the injection amount corrected by the injection amount correction means 10.

In this embodiment, there is constituted injector drive means 12 by the injection amount correction means 10, the injection command generation means 11 and the injector drive circuit 2. The injector drive means 12 drives the injector 1 so as to inject from the injector the fuel amount determined based on the basic injection amount which is arithmetically operated relative to various control conditions and the intake air amount estimated from the intake pipe pressure of the engine.

In the fuel injection control system shown in FIG. 1, the injector 1, the injector drive circuit 2, the water temperature sensor 4, the intake air temperature sensor 5, the pressure sensor 7 and the signal generator 9 are comprised by a hardware; on the other hand, the injection amount arithmetical operation means 3, the intake air amount estimation means 6, the accelerating/decelerating state detection means 8 and the injection drive means 12 are comprised by causing a microcomputer in an ECU (an electronic control unit) to execute respectively predetermined programs.

The accelerating/decelerating state detection means 8 samples the intake pipe pressure of the engine by reading the output of the pressure sensor 7 at each sample timing which comes every time a very short time is passed from a timing at which the reference crank angle signal is generated, detects as an intake pipe pressure difference which is a difference between the intake pipe pressure newly sampled at each sample timing and the intake pipe pressure sampled at the corresponding sample timing (a timing at which an elapsed time from the timing where the reference crank angle signal is generated is equal) one combustion cycle before, and detects that the engine is in an accelerating state or decelerating state when the intake pipe pressure difference exceeds a set value.

The accelerating/decelerating state detection means 8 used in this embodiment detects the accelerating state of the engine when the intake pipe pressure newly sampled at each sampling position is higher than that sampled at the corresponding sample timing one combustion cycle before and when the intake pipe pressure difference exceeds the set value, and detects the decelerating state of the engine when the intake pipe pressure newly sampled at each sampling position is lower than that sampled at the corresponding sample timing one combustion cycle before and when the intake pipe pressure difference exceeds the set value.

Further, ECU starts a task at each sample timing which comes every time a very short time (2 msec, for example) is passed from a timing at which the reference crank angle signal is generated by the signal generator immediately before a suction stroke, samples the intake pipe pressure by reading the output of the pressure sensor 7 by processing in this task, and stores the sampled intake pipe pressure as PBADn. Here, a subscript n indicates a number of starting the task.

After storing the intake pipe pressure PBADn sampled this time, PBADn (hereinafter referred as pbadn) sampled at the corresponding timing one combustion cycle before is compared with PBADn sampled this time. When PBADn is higher by a predetermined level than pbadn, it is determined that the throttle valve is opened, thereby determining that the engine is in accelerating state. On the other hand, when PBADn is lower by a predetermined level than pbadn from the result of comparison of PBADn and pbadn, it is determined that the throttle valve is closed, thereby determining that the engine is in decelerating state.

FIGS. 3A to 3F show a signal waveform of each part of the system shown in FIG. 1 when an accelerating operation of an engine is started at time t1, a waveform of an intake pipe pressure PB, and an opening degree αth of a throttle valve.

Figure 3A:
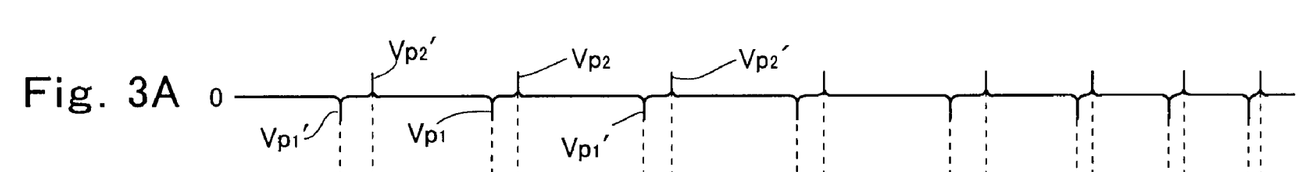

FIG. 3A shows a waveform of pulse signals generated by the signal generator 9. The signal generator 9 detects a leading edge in the rotational direction of a reluctor provided on a not shown rotor at a first set crank angle position which is set at a sufficiently advanced position than a top dead center (a crank angle position when a piston reached the top dead center) to generate negative pulse signals Vp1' and Vp1, and detects a trailing edge in the rotational direction of the reluctor at a second set crank angle position which is set at a slightly advanced position than the top dead center to generate positive pulse signals Vp2' and Vp2. Here, Vp1' and Vp2' indicate pulse signals generated before the top dead center at the time of finishing a compression stroke, and Vp1 and Vp2 indicate pulse signals generated before the top dead center at the time of finishing an exhaust stroke (immediately before a suction stroke).

Figure 3B:
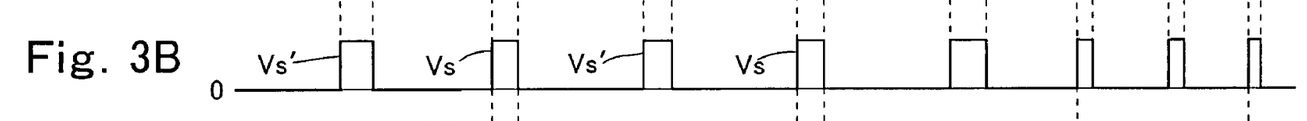

The pulse signals shown in FIG. 3A are converted into rectangular wave like crank angle signals Vs' and Vs as shown in FIG. 3B by a waveform rectifying circuit provided in the ECU, and are input to the microcomputer. The crank angle signal Vs' is a rectangular wave like signal showing H level (a high level) during a period after Vp1' is generated and before Vp2' is generated, and the crank angle signal Vs is a rectangular wave like signal showing the H level during a period after Vp1 is generated and before Vp2 is generated.

In this embodiment, a position at which the crank angle signal Vs' generated at the end of the compression stroke rises is used as a measurement starting position for starting a measurement of an ignition timing. A position at which the crank angle signal Vs generated at the end of the exhaust stroke rises is used as a position for starting a fuel injection. Also, the pulse signal Vp2 generated at the end of the exhaust stroke is used as a reference crank angle signal, and a position at which the crank angle signal Vs drops (a crank angle position corresponding to the timing to shown in the drawing), which is a generation position of the reference crank angle signal, is used as a reference crank angle position.

Figure 3C:
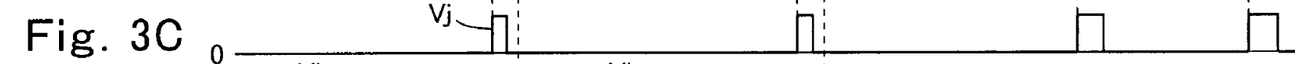

FIG. 3C shows an injection command signal Vj which is provided to the injector drive circuit 2. The injection command signal Vj is generated at the rising position of the crank angle signal Vs. The signal width of the injection command signal Vj is set at the width required for injecting the fuel from the injector during the arithmetically operated injection time.

Figure 3D:
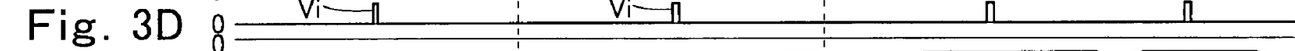

FIG. 3D shows an ignition signal Vi which is given to an ignition system at an ignition timing of the engine. The ignition signal is generated when the ECU detects the arithmetically operated ignition timing at the end of the compression stroke of the engine. The ignition system generates a high voltage for ignition when the ignition signal Vi is provided, and applies the high voltage to an ignition plug to cause an ignition operation.

Figure 3E:
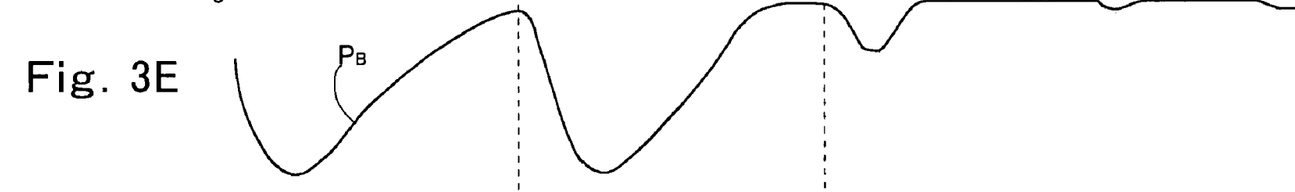
Figure 3F:
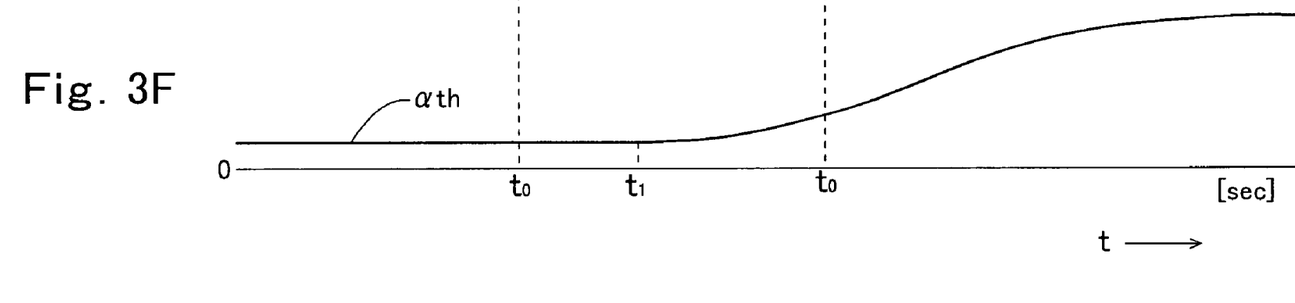

FIG. 3E shows variations of the intake pipe pressure PB. As indicated in the drawing, the intake pipe pressure shows a maximum value around the end of the exhaust stroke, and shows a minimum value from the end of the suction stroke to the beginning of the compression stroke. FIG. 3F shows variations of an opening degree of the throttle valve. In this embodiment, the accelerating operation is started at time t1.

When the throttle valve is opened at time t1, and the accelerating operation is performed, the intake pipe pressure is getting higher since the amount of air flowing into the intake pipe through the throttle valve is increased. In order to simplify the variation of the intake pipe pressure before and after the accelerating operation, a measured waveform of the intake pipe pressure PB after the accelerating operation is started is superimposed on a measured waveform of the intake pipe pressure PB one combustion cycle before (when the accelerating operation is not performed) in FIG. 4D. A waveform "a" shows a waveform of the intake pipe pressure after the accelerating operation is performed at time t1, and a waveform "b" shows a waveform of the intake pipe pressure one combustion cycle before.

Figure 4A:
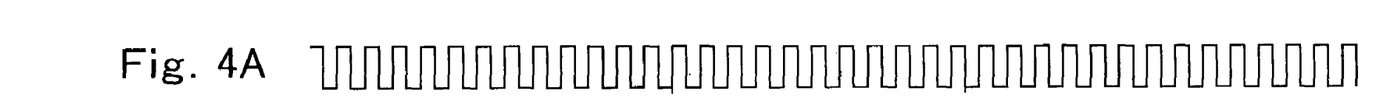

FIG. 4A shows a waveform of a pulse which provides a timing (a sample timing) for starting a task performing the accelerating/decelerating state detection process and is provided from a timer in the microcomputer. In this embodiment, the task is started at the rising and dropping positions of each pulse shown in FIG. 4A.

Figures 4B, 4C:
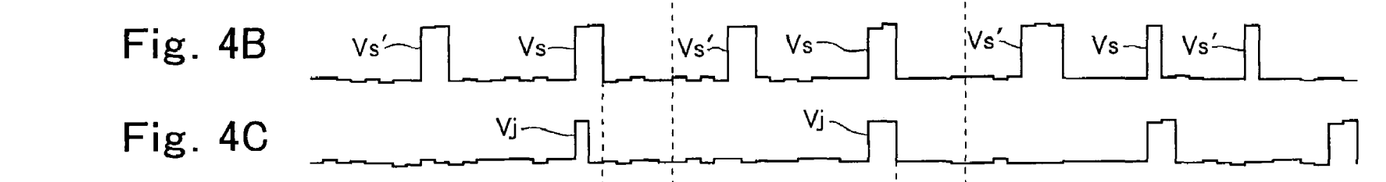

FIG. 4B shows the same crank angle signals Vs and Vs' as shown in FIG. 3B, which are generated from output pulses of the signal generator 9. FIG. 4C shows the injection command signal Vj, and FIG. 4E shows variations of the opening degree αth of the throttle valve.

Figures 4D, 4E:
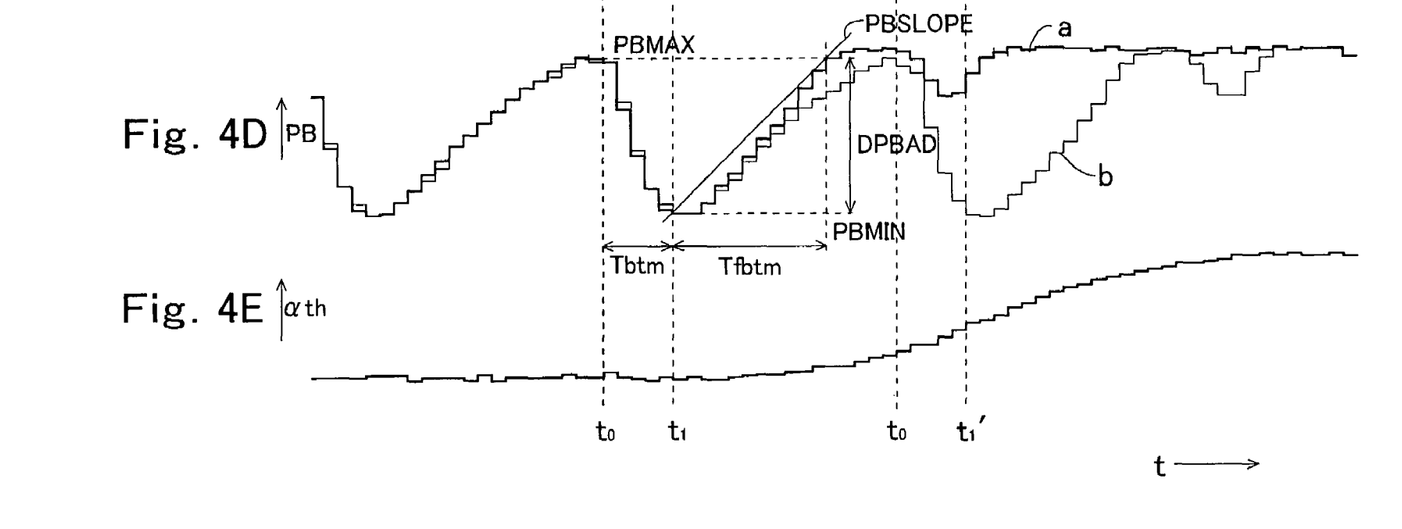

In FIG. 4D, since the waveform of the intake pipe pressure before starting the accelerating operation is the same as the waveform one combustion cycle before, a waveform "a" and a waveform "b" overlap each other. In a period after starting the accelerating operation, the waveform of the intake pipe pressure in a combustion cycle in which the acceleration is started is increasing with large inclination compared to the waveform one combustion cycle before, since the opened throttle valve causes a degree of a rise of the intake pipe pressure to be increasing.

Thus, the intake pipe pressure in each combustion cycle rises more than the intake pipe pressure one combustion cycle before in accelerating state of the engine. Therefore, the intake pipe pressure sampled at each sample timing is compared with the intake pipe pressure sampled at the corresponding sample timing one combustion cycle before. As the result, when the intake pipe pressure newly sampled is higher by the predetermined level than the intake pipe pressure sampled at the corresponding sample timing one combustion cycle before, it can be determined that the engine is in accelerating state.

In the present invention, the sample timing for sampling the intake pipe pressure is specified every combustion cycles. It is assumed that each sample timing in each combustion cycle is specified by an elapsed time from a timing "to", at which the reference crank angle signal is generated in the combustion cycle, to each sample timing, and that sample timings having the same elapsed time (a time relative to the timing where the reference crank angle signal is generated) from the timing "to" at which the reference crank angle signal is generated are considered as the corresponding timings. For example, in FIG. 4, the sample timing one combustion cycle before, which corresponds to the sample timing t1', is t1.

Figure 5A:
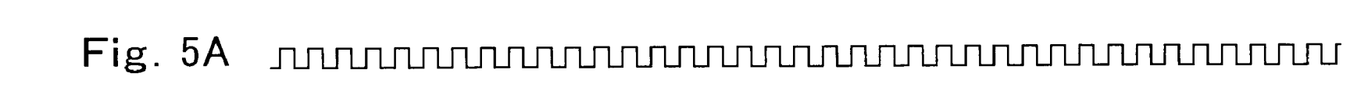
Figure 5B:
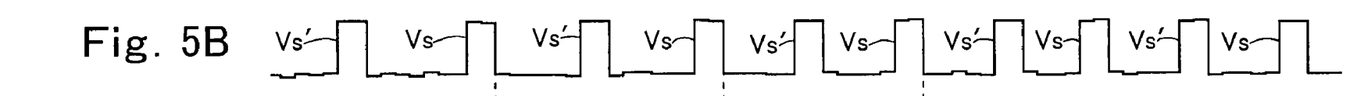
Figures 5C, 5D, 5E:
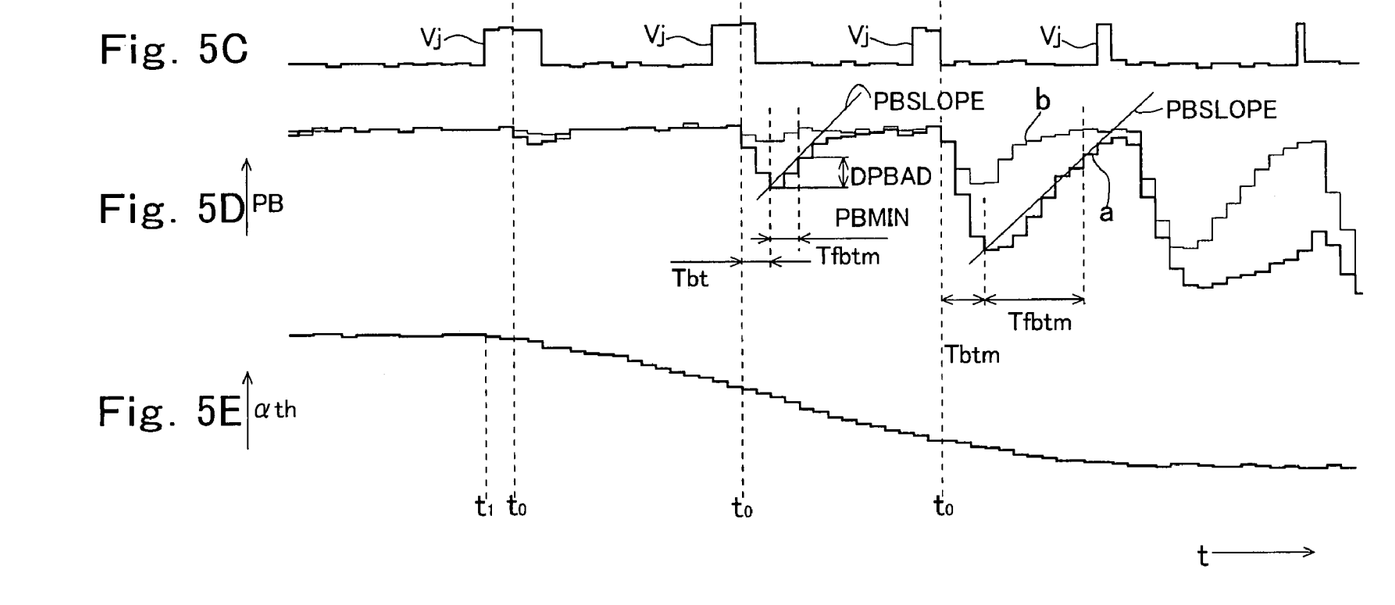

A signal waveform in each part of the system shown in FIG. 1 and a waveform of the intake pipe pressure when the decelerating operation of the engine is performed are shown in FIG. 5A to 5E. FIG. 5A shows a waveform of a pulse providing a timing for starting a task to perform an accelerating/decelerating state detecting operation (a sample timing), and FIG. 5B shows crank angle signals Vs' and Vs which are generated from output pulses of the signal generator 9. FIG. 5C shows an injection command signal Vj, and FIG. 5D shows a waveform "a" of the intake pipe pressure after a decelerating operation is performed at time t1 and a waveform "b" of the intake pipe pressure one combustion cycle before, which are lying on top of the other. FIG. 5E shows variations of an opening degree αth of a throttle valve.

In FIG. 5D, since the waveform of the intake pipe pressure before starting the decelerating operation is the same as the waveform one combustion cycle before, the waveforms "a" and "b" are lying on top of the other. In a period after starting the decelerating operation, the waveform of the intake pipe pressure in a combustion cycle in which the deceleration is started is lowered compared to the waveform one combustion cycle before, since the throttle valve is closed, and a degree of a rise of the intake pipe pressure is decreased.

Thus, the intake pipe pressure in each combustion cycle becomes less than the intake pipe pressure one combustion cycle before in decelerating state of the engine. Therefore, the intake pipe pressure sampled at each sample timing is compared with the intake pipe pressure sampled at the corresponding sample timing one combustion cycle before. As the result, when the intake pipe pressure newly sampled is lower by the predetermined level than the intake pipe pressure sampled at the corresponding sample timing one combustion cycle, the decelerating state of the engine can be determined.

Figure 2:
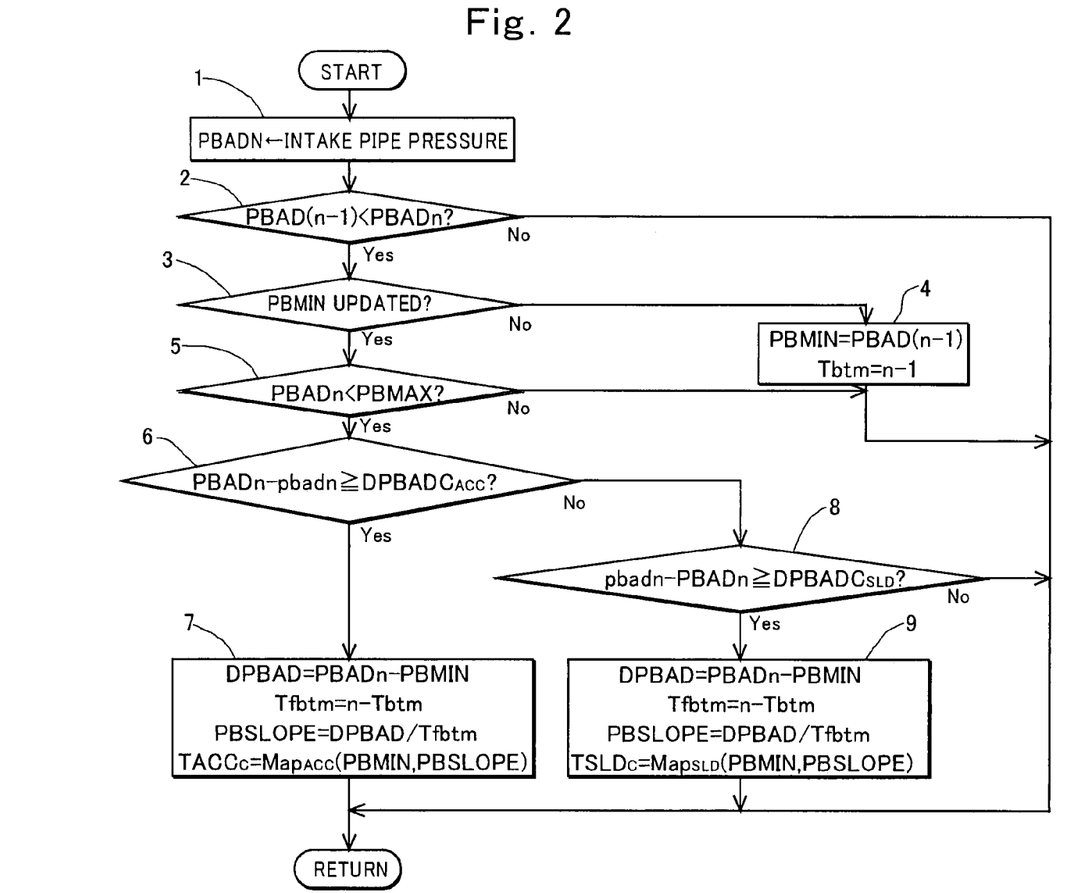
FIG. 2 is a flowchart showing an algorithm of a task executed by a microcomputer in the embodiment of the invention.

In order to practice the accelerating/decelerating state detection method according to the invention, there is shown in FIG. 2 a flowchart showing an algorithm of a task which is carried out by a microcomputer of an ECU at each sample timing which comes every time a very short time (2 msec, for example) is passed after a reference crank angle signal is generated. In this task, at first, an output of a pressure sensor detecting a pressure in an intake pipe is sampled as an intake pipe pressure in Step 1 and is stored as PBADn. Then, at Step 2, it is determined whether or not PBADn sampled this time is changed so as to increase (whether or not PBADn sampled this time is larger than the intake pipe pressure PBAD(n−1) sampled last time). As a result, when it is determined that PBADn samlpled this time is not changed (when the minimum value PBMIN of the intake pipe pressure is not detected), this task is finished without taking any further action.

When it is determined in Step 2 that PBADn sampled this time is larger than PBAD(n−1) sampled last time, it is determined in Step 3 whether or not an update of the minimum value PBMIN is completed. In the case where the updated is not completed, the process goes to Step 4, PBMIN is updated using PBAD(n−1) sampled last time as the minimum value of the intake pipe pressure, and n−1 is stored on time Tbtm, at which the minimum value of the intake pipe pressure is appeared, to finish this task.

When this task is conducted at the next sample timing, it is determined that PBMIN is updated in Step 3. Therefore, the process goes to Step 5 to determine whether PBADn is smaller than the maximum value PBMAX of the intake pipe pressure one combustion cycle before. As the result, when it is determined that PBADn exceeds the maximum value PBMAX of the intake pipe pressure one combustion cycle before, this task is finished without taking any further action. When it is determined in Step 5 that PBADn is lower than the maximum value PBMAX of the intake pipe pressure one combustion cycle before, the process goes to Step 6, and PBADn sampled this time is compared with pbadn sampled at the corresponding sample timing one combustion cycle before (a sample timing at which an elapsed time from a generating timing of the reference crank angle signal is equal to an elapsed time from the generating timing of the reference crank angle signal at the current sample timing). As the result, it is determined that the engine is in accelerating state when a difference (PBADn−pbadn, which is an intake pipe pressure difference) between PBADn and pbadn is equal to or more than an accelerating state determination reference value DPBADCACC. Then, in Step 7, an acceleration increasing correction value arithmetically operation process is performed for arithmetically operate an acceleration increasing correction value.

In the acceleration increasing correction value arithmetically operation process, a difference PBADn−PBMIN between PBADn sampled this time and the minimum value PBMIN of the intake pipe pressure in the current combustion cycle is obtained and stored as DPBAD. Also, a difference n−Tbtm between an elapsed time n from the generation timing of the reference crank angle signal immediately before to the sample timing this time and a generation time of the minimum value of the intake pipe pressure is arithmetically operated, which is stored as an elapsed time Tfbtm from the generation timing of the minimum value of the intake pipe pressure. Further, the acceleration increasing correction value TACCc is obtained by obtaining a slope PBSLOPE(=DPBAD/Tfbtm) of the waveform of the intake pipe pressure from the intake pipe pressure difference DPBAD and the elapsed time Tfbtm, and by searching an acceleration increasing map MapACC(PBMIN, PBSLOPE) against the minimum value PBMIN and the slope PBSLOPE of the intake pipe pressure. The operated correction value is added to an injection time which is arithmetically operated by the injection amount arithmetically operation means in the next combustion cycle. After the acceleration increasing correction value TACCc is obtained, this task is finished.

When it is not determined that the engine is in accelerating state in Step 6, the process goes to Step 8 to determine whether a difference between pbadn and PBADn (pbadn−PBADn) is equal to or more than a decelerating state determination reference value DPBADCSLD. As a result, when the difference between pbadn and PBADn (pbadn−PBADn) is equal to or more than the decelerating state determination reference value DPBADCSLD, it is determined that the engine is in decelerating state, and a deceleration decreasing correction value arithmetically operation process for arithmetically operating a deceleration decreasing correction value is performed in Step 9.

In the deceleration decreasing correction value arithmetically operation process, a difference PBADn−PBMIN between PBADn sampled this time and the minimum value PBMIN of the intake pipe pressure in the current combustion cycle is obtained and stored as DPBAD. Also, a difference n−Tbtm between an elapsed time n from the generation timing of the reference crank angle signal immediately before to the sample timing this time and a generation time of the minimum value of the intake pipe pressure is arithmetically operated, which is stored as an elapsed time Tfbtm from the generation timing of the minimum value of the intake pipe pressure. Further, a deceleration decreasing correction value TSLDc is obtained by obtaining a slope (an increasing rate per unit time) PBSLOPE(=DPBAD/Tfbtm) of the waveform of the intake pipe pressure from the intake pipe pressure difference DPBAD and the elapsed time Tfbtm, and by searching a deceleration decreasing map MapSLD(PBMIN, PBSLOPE) against the minimum value PBMIN and the slope PBSLOPE of the intake pipe pressure. The operated correction value is subtracted from an injection time which is arithmetically operated by the injection amount arithmetically operation means in the next combustion cycle. After the deceleration decreasing correction value TSLDc is obtained, this task is finished.

As aforementioned, in this embodiment, when the accelerating state and decelerating state of the engine is detected respectively, the arithmetical operations for correcting the fuel injection amount at the accelerating state and the fuel injection amount at the decelerating state are performed according to the minimum value of the intake pipe pressure and the increasing rate per unit time of the intake pipe pressure in a pressure increasing process following the minimum value.

The arithmetical operation for correcting the fuel injection amount may be performed by adding (or subtracting) the correction amount to (from) the basic injection amount operated relative to various control conditions such as the rotational speed of the engine, an atmospheric pressure and an engine temperature, or by multiplying a correction coefficient by the basic injection amount operated relative to the various control conditions.

The arithmetical operation for the correction amount or the correction coefficient relative to the minimum value of the intake pipe pressure and the increasing rate of the intake pipe pressure in a pressure increasing process following the minimum value can be performed by search a map which provides the relationship among the minimum value of the intake pipe pressure, the increasing rate of the intake pipe pressure, and the correction amount or correction coefficient.

The minimum value of the intake pipe pressure becomes high when the engine is in accelerating state and becomes low when the engine is in decelerating state. The increasing rate per unit time of the intake pipe pressure in the pressure increasing process following the minimum value becomes equal to or higher than a rate in a stationary state when the engine is in accelerating state, and becomes lower than the rate in the stationary state when the engine is in decelerating state. Thus, as described above, when the arithmetical operation for correcting the fuel injection amount in accelerating state of the engine and the fuel injection amount in decelerating state of the engine is performed according to the minimum value of the intake pipe pressure and the increasing rate per unit time of the intake pipe pressure in the pressure increasing process following the minimum value, the correction operation of the fuel injection amount can be accurately performed.

In the above embodiment, the intake pipe pressure of the engine is sampled at each sample timing which comes every time the very short time is passed from the timing at which the reference crank angle signal is generated, and the difference between the intake pipe pressure newly sampled at each sample timing and an intake pipe pressure sampled at the corresponding sample timing one combustion cycle before is detected as the intake pipe pressure difference, in every stroke in a combustion stroke of the engine.

However, in the present invention, a method for sampling the intake pipe pressure is not limited to the example shown in the above embodiment. For example, in the same manner as the method disclosed in Japanese Patent Application Laid-Open No. 2002-242749, the difference between the intake pipe pressure sampled at each sampling position and the intake pipe pressure sampled at the same sampling position one combustion cycle before may be detected as the intake pipe pressure difference, using the predetermined crank angle positions as sampling positions, when the combustion stroke of the engine is in a suction stroke.

Thus, when the combustion stroke of the engine is in a suction stroke, the difference between the intake pipe pressure sampled at each sampling position and the intake pipe pressure sampled at the same sampling position one combustion cycle before is detected as the intake pipe pressure difference, using predetermined crank angle positions as sampling positions. On the other hand, when the combustion stroke of the engine is in other than the suction stroke, the difference between the intake pipe pressure sampled at each sample timing and the intake pipe pressure sampled at the corresponding sample timing one combustion cycle before is detected as the intake pipe pressure difference, using each timing which comes every time the very short time is passed from the timing at which the reference crank angle signal is generated as each sample timing. Then, the accelerating state of the engine is detected when the intake pipe pressure newly sampled at each sampling position or at the sample timing is higher than the intake pipe pressure sampled at the same sampling position or at the corresponding sample timing one combustion cycle before, and also when the intake pipe pressure difference exceeds the set value. The decelerating state of the engine is detected when the intake pipe pressure newly sampled at each sampling position or at the sample timing is lower than the intake pipe pressure sampled at the same sampling position or at the corresponding sample timing one combustion cycle before, and also when the intake pipe pressure difference exceeds the set value.

With the construction described above, the sampling position in the suction stroke can be detected from a zero-cross point (refer to FIG. 6B) of an AC voltage obtained from a generation coil provided in an AC generator rotating synchronously with the engine in the same manner as the method disclosed in Japanese Patent Application Laid-Open No. 2002-242749.

Also, an encoder for generating a pulse every time a crank shaft rotates at a very small angle may be attached to the engine, and each crank angle position where the encoder generates each pulse may be used as each sampling position.

The suction stroke of the engine can be detected by arithmetically operating a time that the crankshaft requires for rotating 180 degrees from the rotational speed of the engine detected when the reference crank angle signal is generated immediately before the suction stroke (when the fall of the crank angle signal Vs is detected), and by measuring the time by a timer. The rotational speed of the engine can be obtained by the arithmetical operation from a period with which the signal generator 9 generates the reference crank angle signal.

As aforementioned, in the suction stroke where the intake valve is opened and the intake pipe pressure is influenced by the crank angle (a movement of a piston), the difference between the intake pipe pressure sampled at each sampling position and the intake pipe pressure sampled at the same sampling position one combustion cycle before is detected as the intake pipe pressure difference, using the predetermined crank angle positions as sampling positions. In the stroke other than the suction stroke where the intake pipe pressure is determined by an opening area of the throttle valve and an elapsed time, the difference between the intake pipe pressure sampled at each sample timing, which comes every time the very short time is passed from the timing at which the reference crank angle signal is generated, and the intake pipe pressure sampled at the corresponding sample timing one combustion cycle before is detected as the intake pipe pressure difference. Then, from the detected intake pipe pressure difference, the accelerating and (or) decelerating state of the engine is detected. In that case, the intake pipe pressure newly sampled and the intake pipe pressure one combustion cycle before can be accurately compared in each stroke, thus the detection of the accelerating and (or) decelerating state of the engine can be performed more accurately.

Also, in this case, the accelerating state of the engine can be detected when the intake pipe pressure newly sampled at each sampling position or at each sample timing is higher than the intake pipe pressure sampled at the same sampling position or at the corresponding sample timing one combustion cycle before, and also when the intake pipe pressure difference exceeds the set value. The decelerating state of the engine is detected when the intake pipe pressure newly sampled at each sampling position or at the sample timing is lower than the intake pipe pressure sampled at the same sampling position or at the corresponding sample timing one combustion cycle before, and also when the intake pipe pressure difference exceeds the set value.

In the above embodiment, although the reference crank angle position is set at a position immediately in front of the crank angle position where the suction stroke of the engine is started, the invention is not limited to such a case for setting the reference crank angle position. For example, the reference crank angle position may be set at a position near the crank angle position where the suction stroke of the engine is finished.

In the above embodiment, the fuel injection amount at the accelerating state and the fuel injection amount at the decelerating state are corrected according to the minimum value of the intake pipe pressure and the increasing rate per unit time of the intake pipe pressure in the pressure increasing process following the minimum value. However, the method for correcting the fuel injection amount at the accelerating and the fuel injection amount at the decelerating state are not limited to the above example.

For example, when the accelerating state of the engine is detected and when the decelerating state of the engine is detected, the intake pipe pressure of the engine is sampled at each sample timing which comes every time the very short time is passed from the timing at which the reference crank angle signal is generated, and the difference between the intake pipe pressure sampled at each sample timing and the intake pipe pressure sampled at the corresponding sample timing one combustion cycle before is detected. When the detected intake pipe pressure difference exceeds the set value, the difference is integrated. Based on the integrated value of the difference, it may be arithmetically operated a correction amount to be added to the basic injection amount or a correction coefficient to be multiplied to the basic injection amount, for correcting the fuel injection amount at the accelerating state and the fuel injection amount at the decelerating state.

As shown in FIGS. 4A to 4E and 5A to 5E, since the difference of the intake pipe pressure becomes large at the accelerating and decelerating state of the engine, it is possible to accurately perform the arithmetical operation for correcting the fuel injection amount at the accelerating and at the decelerating state if the arithmetical operation is performed according to the difference of the intake pipe pressure as stated above. In addition, in the case where the arithmetical operation is performed relative to the integrated value of the difference, not to the difference operated at each sample timing, an effect of noise can be reduced to accurately perform the arithmetical operation for correcting the fuel injection amount.

Furthermore, when the accelerating state of the engine is detected by the accelerating/decelerating state detection method of the present invention, a period of time for which the sampled value of the intake pipe pressure exceeds the maximum value of the intake pipe pressure one combustion cycle before may be measured, and the arithmetical operation for correcting the fuel injection amount at the accelerating state may be performed according to the period of time.

When the engine is in accelerating state, the value of the intake pipe pressure sampled in the exhaust stroke exceeds the maximum value of the intake pipe pressure one combustion cycle before as shown in FIG. 4. Then, the larger the acceleration of the engine becomes, the longer the period of time for which the sampled value of the intake pipe pressure exceeds the maximum value of the intake pipe pressure one combustion cycle before becomes. Thus, as stated above, the arithmetical operation for correcting the fuel injection amount at the accelerating state can be performed accurately, when it is performed according to the period of time for which the sampled value of the intake pipe pressure exceeds the maximum value of the intake pipe pressure one combustion cycle before.

Also, when the accelerating state of the engine is detected and when the decelerating state of the engine is detected, the intake pipe pressure of the engine is sampled at each sample timing which comes every time the very short time is passed from the timing at which the reference crank angle signal is generated, and the difference between the intake pipe pressure sampled at each sample timing and the intake pipe pressure sampled at the corresponding sample timing one combustion cycle before is detected. Then, a time difference between a specific timing when the detected intake pipe pressure difference exceeds the set value for the first time and a generation timing of the reference crank angle signal immediately before the specific timing is obtained. According to the time difference, the arithmetical operation for correcting the fuel injection amount at the accelerating state and the fuel injection amount at the decelerating state may be performed.

The time difference between the specific timing when the detected intake pipe pressure difference exceeds the set value for the first time and the generation timing of the reference crank angle signal immediately before the specific timing becomes smaller as the increasing rate and the decreasing rate of the engine become larger. Consequently, the arithmetical operation for correcting the fuel injection amount at the accelerating state and the fuel injection amount at the decelerating state can be performed accurately, when it is performed according to the aforementioned time difference.

While the foregoing description referred to a single-cylinder engine, the invention can as well be applied to engines having two or more cylinders.

Although a preferred embodiment of the invention has been described and illustrated with reference to the accompanying drawings, it will be understood by those skilled in the art that it is by way of examples, and that various changes and modifications may be made without departing from the spirit and scope of the invention, which is defined only to the appended claims.

What is claimed is:

1. A fuel injection control system for an engine having injection amount arithmetical operation means for arithmetically operating a basic injection amount relative to an intake air amount estimated from an intake pipe pressure of the engine and various control conditions and injector drive means for driving an injector so as to inject from said injector a fuel which amount is determined based on said basic injection amount, which comprises:
 a signal generator which generates a reference crank angle signal at a reference crank angle position which is a specific crank angle position of said engine, and
 accelerating/decelerating state detection means which: samples an intake pipe pressure of the engine at each sample timing which comes every time a very short time is passed from a timing at which said reference crank angle signal is generated; detects an intake pipe pressure difference which is a difference between the intake pipe pressure sampled at each sample timing and an intake pipe pressure sampled at the corresponding sample timing one combustion cycle before; and detects whether said engine is in an accelerating state or in a decelerating state when said intake pipe pressure difference exceeds a set value,
 wherein said injector drive means is constituted so as to determine the amount of fuel injected from said injector by correcting said basic injection amount to be matched with the detected state, when the accelerating state is detected and/or when the decelerating state of the engine is detected by said accelerating/decelerating state detection means.

2. A fuel injection control system for an engine having injection amount arithmetical operation means for arithmetically operating a basic injection amount relative to an intake air amount estimated from an intake pipe pressure of the engine and various control conditions and injector drive means for driving an injector so as to inject from said injector a fuel which amount is determined based on said basic injection amount, which comprises:
 a signal generator which generates a reference crank angle signal at a reference crank angle position which is a specific crank angle position of said engine, and
 accelerating/decelerating state detection means which: samples an intake pipe pressure of the engine at each sample timing which comes every time a very short time is passed from a timing at which said reference crank angle signal is generated; detects an intake pipe pressure difference which is a difference between the intake pipe pressure sampled at each sample timing and an intake pipe pressure sampled at the corresponding sample timing one combustion cycle before; and detects whether said engine is in an accelerating state or in a decelerating state when said intake pipe pressure difference exceeds a set value,
 wherein said injector drive means is constituted so as to determine the amount of fuel injected from said injector by correcting said basic injection amount according to a minimum value of said intake pipe pressure and an increasing rate per unit time of the intake pipe pressure in a pressure increasing process following the minimum value, when the accelerating state is detected and/or when the decelerating state of the engine is detected by said accelerating/decelerating state detection means.

3. A fuel injection control system for an engine as set forth in claim 2, wherein said reference crank angle position is set at a position immediately in front of a crank angle position where a suction stroke of said engine is started.

4. A fuel injection control system for an engine as set forth in claim 2, wherein said reference crank angle position is set at a position near a crank angle position where a suction stroke of said engine is finished.

5. A fuel injection control system for an engine having injection amount arithmetical operation means for arithmetically operating a basic injection amount relative to an intake air amount estimated from an intake pipe pressure of the engine and various control conditions and injector drive means for driving an injector so as to inject from said injector a fuel which amount is determined based on said basic injection amount, which comprises:
 a signal generator which generates a reference crank angle signal at a reference crank angle position which is a specific crank angle position of said engine, and
 accelerating/decelerating state detection means which: samples an intake pipe pressure of the engine at each sample timing which comes every time a very short time is passed from a timing at which said reference crank angle signal is generated; detects an intake pipe pressure difference which is a difference between the intake pipe pressure newly sampled at each sample timing and an intake pipe pressure sampled at the corresponding sample timing one combustion cycle before; detects an accelerating state of the engine when the intake pipe pressure newly sampled at each sample timing is higher than that sampled at the corresponding sample timing one combustion cycle before and when the intake pipe pressure difference exceeds a set value; and detects a decelerating state of the engine when the intake pipe pressure newly sampled at each sample timing is lower than that sampled at the corresponding sample timing one combustion cycle before and when the intake pipe pressure difference exceeds the set value,
 wherein said injector drive means is constituted so as to determine the amount of fuel injected from said injector by correcting said basic injection amount according to a minimum value of said intake pipe pressure and an increasing rate per unit time of the intake pipe pressure in a pressure increasing process following the minimum value, when the accelerating state is detected and/or when the decelerating state of the engine is detected by said accelerating/decelerating state detection means.

6. A fuel injection control system for an engine as set forth in claim 5, wherein said reference crank angle position is set at a position immediately in front of a crank angle position where a suction stroke of said engine is started.

7. A fuel injection control system for an engine as set forth in claim 5, wherein said reference crank angle position is set at a position near a crank angle position where a suction stroke of said engine is finished.

8. A fuel injection control system for an engine having injection amount arithmetical operation means for arithmetically operating a basic injection amount relative to an intake air amount estimated from an intake pipe pressure of the engine and various control conditions and injector drive means for driving an injector so as to inject from said injector a fuel which amount is determined based on said basic injection amount, which comprises:
  a signal generator which generates a reference crank angle signal at a reference crank angle position which is a specific crank angle position of said engine, and
  accelerating/decelerating state detection means which: detects as an intake pipe pressure difference a difference between an intake pipe pressure sampled at each sampling position and an intake pipe pressure sampled at the same sampling position one combustion cycle before, using predetermined crank angle positions as sampling positions, when a combustion stroke of said engine is in a suction stroke; detects as the intake pipe pressure difference the difference between the intake pipe pressure sampled at each sampling position and the intake pipe pressure sampled at the same sampling position one combustion cycle before, using each sample timing which comes every time a very short time is passed from the timing at which said reference crank angle signal is generated as the sample timing, when the combustion stroke of said engine is in other than the suction stroke; detects an accelerating state of said engine when the intake pipe pressure newly sampled at each sample timing or each sampling position is higher than that sampled at the corresponding sample timing or sampling position one combustion cycle before and when the intake pipe pressure difference exceeds a set value; and detects a decelerating state of the engine when the intake pipe pressure newly sampled at each sample timing or each sampling position is lower than that sampled at the corresponding sample timing or sampling position one combustion cycle before and when the intake pipe pressure difference exceeds the set value,
  wherein said injector drive means is constituted so as to determine the amount of fuel injected from said injector by correcting said basic injection amount according to a minimum value of said intake pipe pressure and an increasing rate per unit time of the intake pipe pressure in a pressure increasing process following the minimum value, when the accelerating state is detected and/or when the decelerating state of the engine is detected by said accelerating/decelerating state detection means.

9. A fuel injection control system for an engine as set forth in claim 8, wherein said reference crank angle position is set at a position immediately in front of a crank angle position where a suction stroke of said engine is started.

10. A fuel injection control system for an engine as set forth in claim 8, wherein said reference crank angle position is set at a position near a crank angle position where a suction stroke of said engine is finished.

11. A fuel injection control system for an engine having injection amount arithmetical operation means for arithmetically operating a basic injection amount relative to an intake air amount estimated from an intake pipe pressure of the engine and various control conditions and injector drive means for driving an injector so as to inject from said injector a fuel which amount is determined based on said basic injection amount, which comprises:
  a signal generator which generates a reference crank angle signal at a reference crank angle position which is a specific crank angle position of said engine, and
  accelerating/decelerating state detection means which: samples an intake pipe pressure of the engine at each sample timing which comes every time a very short time is passed from a timing at which said reference crank angle signal is generated; detects an intake pipe pressure difference which is a difference between the intake pipe pressure newly sampled at each sample timing and an intake pipe pressure sampled at the corresponding sample timing one combustion cycle before; detects an accelerating state of the engine when the intake pipe pressure newly sampled at each sample timing is higher than that sampled at the corresponding sample timing one combustion cycle before and when the intake pipe pressure difference exceeds a set value; and detects a decelerating state of the engine when the intake pipe pressure newly sampled at each sample timing is lower than that sampled at the corresponding sample timing one combustion cycle before and when the intake pipe pressure difference exceeds the set value,
  wherein said injector drive means is constituted so as to integrate said intake pipe pressure difference when the intake pipe pressure difference exceeds the set value, and determine the amount of fuel injected from said injector by correcting said basic injection amount based on the integrated value of the difference, when the accelerating state is detected and/or when the decelerating state of the engine is detected by said accelerating/decelerating state detection means.

12. A fuel injection control system for an engine as set forth in claim 11, wherein said reference crank angle position is set at a position immediately in front of a crank angle position where a suction stroke of said engine is started.

13. A fuel injection control system for an engine as set forth in claim 11, wherein said reference crank angle position is set at a position near a crank angle position where a suction stroke of said engine is finished.

14. A fuel injection control system for an engine having injection amount arithmetical operation means for arithmetically operating a basic injection amount relative to an intake air amount estimated from an intake pipe pressure of the engine and various control conditions and injector drive means for driving an injector so as to inject from said injector a fuel which amount is determined based on said basic injection amount, which comprises:
  a signal generator which generates a reference crank angle signal at a reference crank angle position which is a specific crank angle position of said engine, and
  accelerating/decelerating state detection means which: detects as an intake pipe pressure difference a difference between an intake pipe pressure sampled at each sampling position and an intake pipe pressure sampled at the same sampling position one combustion cycle before, using predetermined crank angle positions as sampling positions, when a combustion stroke of said engine is in a suction stroke; detects as the intake pipe pressure difference the difference between the intake pipe pressure sampled at each sample timing and the intake pipe pressure sampled at the corresponding sample timing one combustion cycle before, using each sample timing which comes every time a very short time is passed from the timing at which said reference crank angle signal is generated as each sample timing, when the combustion stroke of said engine is in other than the suction stroke; detects an accelerating state of said engine when the intake pipe pressure newly sampled at each sample timing or each sampling position is higher than that sampled at the corresponding sample timing or sampling position one combustion cycle before and when the intake pipe pressure difference exceeds a set value; and detects a decelerating state of the engine when the intake pipe pressure newly sampled at each sample timing or each sampling position is lower than that sampled at the corresponding sample timing or sampling position one combustion cycle before and when the intake pipe pressure difference exceeds the set value, wherein said injector drive means is constituted so as to integrate said intake pipe pressure difference when the intake pipe pressure difference exceeds the set value, and determine the amount of fuel injected from said injector by correcting said basic injection amount based on the integrated value of the difference, when the accelerating state is detected and/or when the decelerating state of the engine is detected by said accelerating/decelerating state detection means.

15. A fuel injection control system for an engine as set forth in claim 14, wherein said reference crank angle position is set at a position immediately in front of a crank angle position where a suction stroke of said engine is started.

16. A fuel injection control system for an engine as set forth in claim 14, wherein said reference crank angle position is set at a position near a crank angle position where a suction stroke of said engine is finished.

17. A fuel injection control system for an engine having injection amount arithmetical operation means for arithmetically operating a basic injection amount relative to an intake air amount estimated from an intake pipe pressure of the engine and various control conditions and injector drive means for driving an injector so as to inject from said injector a fuel which amount is determined based on said basic injection amount, which comprises:

a signal generator which generates a reference crank angle signal at a reference crank angle position which is a specific crank angle position of said engine, and accelerating state detection means which: samples an intake pipe pressure of the engine at each sample timing which comes every time a very short time is passed from a timing at which said reference crank angle signal is generated; detects an intake pipe pressure difference which is a difference between the intake pipe pressure newly sampled at each sample timing and an intake pipe pressure sampled at the corresponding sample timing one combustion cycle before; detects an accelerating state of the engine when the intake pipe pressure newly sampled at each sample timing is higher than that sampled at the corresponding sample timing one combustion cycle before and when the intake pipe pressure difference exceeds a set value, wherein said injector drive means is constituted so as to measure a period of time for which the sampled value of the intake pipe pressure exceeds a maximum value of the intake pipe pressure one combustion cycle before and determine the amount of fuel injected from said injector by correcting said basic injection amount based on the period of time, when the accelerating state is detected by said accelerating state detection means.

18. A fuel injection control system for an engine as set forth in claim 17, wherein said reference crank angle position is set at a position immediately in front of a crank angle position where a suction stroke of said engine is started.

19. A fuel injection control system for an engine as set forth in claim 17, wherein said reference crank angle position is set at a position near a crank angle position where a suction stroke of said engine is finished.

20. A fuel injection control system for an engine having injection amount arithmetical operation means for arithmetically operating a basic injection amount relative to an intake air amount estimated from an intake pipe pressure of the engine and various control conditions and injector drive means for driving an injector so as to inject from said injector a fuel which amount is determined based on said basic injection amount, which comprises:

a signal generator which generates a reference crank angle signal at a reference crank angle position which is a specific crank angle position of said engine, and accelerating state detection means which: detects as an intake pipe pressure difference a difference between an intake pipe pressure sampled at each sampling position and an intake pipe pressure sampled at the same sampling position one combustion cycle before, using predetermined crank angle positions as sampling positions, when a combustion stroke of said engine is in a suction stroke; detects as the intake pipe pressure difference the difference between the intake pipe pressure sampled at each sample timing and the intake pipe pressure sampled at the corresponding sample timing one combustion cycle before, using each sample timing which comes every time a very short time is passed from the timing at which said reference crank angle signal is generated as the sample timing, when the combustion stroke of said engine is in other than the suction stroke; and detects an accelerating state of said engine when the intake pipe pressure newly sampled at each sample timing or each sampling position is higher than that sampled at the corresponding sample timing or sampling position one combustion cycle before and when the intake pipe pressure difference exceeds a set value, wherein said injector drive means is constituted so as to measure a period of time for which the sampled value of the intake pipe pressure exceeds a maximum value of the intake pipe pressure one combustion cycle before and determine the amount of fuel injected from said injector by correcting said basic injection amount based on the period of time, when the accelerating state is detected by said accelerating state detection means.

21. A fuel injection control system for an engine as set forth in claim 20, wherein said reference crank angle position is set at a position immediately in front of a crank angle position where a suction stroke of said engine is started.

22. A fuel injection control system for an engine as set forth in claim 20, wherein said reference crank angle position is set at a position near a crank angle position where a suction stroke of said engine is finished.

23. A fuel injection control system for an engine having injection amount arithmetical operation means for arithmetically operating a basic injection amount relative to an intake air amount estimated from an intake pipe pressure of the engine and various control conditions and injector drive means for driving an injector so as to inject from said injector a fuel which amount is determined based on said basic injection amount, which comprises:

a signal generator which generates a reference crank angle signal at a reference crank angle position which is a specific crank angle position of said engine, and accelerating/decelerating state detection means which: samples an intake pipe pressure of the engine at each sample timing which comes every time a very short time is passed from a timing at which said reference crank angle signal is generated; detects an intake pipe pressure difference which is a difference between the intake pipe pressure newly sampled at each sample timing and an intake pipe pressure sampled at the corresponding sample timing one combustion cycle before; detects an accelerating state of the engine when the intake pipe pressure newly sampled at each sample timing is higher than that sampled at the corresponding sample timing one combustion cycle before and when the intake pipe pressure difference exceeds a set value; and detects a decelerating state of the engine when the intake pipe pressure newly sampled at each sample timing is lower than that sampled at the corresponding sample timing one combustion cycle before and when the intake pipe pressure difference exceeds the set value, wherein said injector drive means is constituted so as to: obtain a time difference between a specific timing when the detected intake pipe pressure difference exceeds the set value for the first time and a generation timing of the reference crank angle signal immediately before the specific timing; and determine the amount of fuel injected from said injector by correcting said basic injection amount based on the time difference, when the accelerating state is detected and/or when the decelerating state of the engine is detected by said accelerating/decelerating state detection means.

24. A fuel injection control system for an engine as set forth in claim 23, wherein said reference crank angle position is set at a position immediately in front of a crank angle position where a suction stroke of said engine is started.

25. A fuel injection control system for an engine as set forth in claim 23, wherein said reference crank angle position is set at a position near a crank angle position where a suction stroke of said engine is finished.

26. A fuel injection control system for an engine having injection amount arithmetical operation means for arithmetically operating a basic injection amount relative to an intake air amount estimated from an intake pipe pressure of the engine and various control conditions and injector drive means for driving an injector so as to inject from said injector a fuel which amount is determined based on said basic injection amount, which comprises:

a signal generator which generates a reference crank angle signal at a reference crank angle position which is a specific crank angle position of said engine, and accelerating/decelerating state detection means which: detects as an intake pipe pressure difference a difference between an intake pipe pressure sampled at each sampling position and an intake pipe pressure sampled at the same sampling position one combustion cycle before, using predetermined crank angle positions as sampling positions, when a combustion stroke of said engine is in a suction stroke; detects as the intake pipe pressure difference the difference between the intake pipe pressure sampled at each sample timing and the intake pipe pressure sampled at the corresponding sample timing one combustion cycle before, using each sample timing which comes every time a very short time is passed from the timing at which said reference crank angle signal is generated as the sample timing, when the combustion stroke of said engine is in other than the suction stroke; detects an accelerating state of said engine when the intake pipe pressure newly sampled at each sample timing or each sampling position is higher than that sampled at the corresponding sample timing or sampling position one combustion cycle before and when the intake pipe pressure difference exceeds a set value; and detects a decelerating state of the engine when the intake pipe pressure newly sampled at each sample timing or each sampling position is lower than that sampled at the corresponding sample timing or sampling position one combustion cycle before and when the intake pipe pressure difference exceeds the set value, wherein said injector drive means is constituted so as to: obtain a time difference between a specific timing when the detected intake pipe pressure difference exceeds the set value for the first time and a generation timing of the reference crank angle signal immediately before the specific timing; and determine the amount of fuel injected from said injector by correcting said basic injection amount based on the time difference, when the accelerating state is detected and/or when the decelerating state of the engine is detected by said accelerating/decelerating state detection means.

27. A fuel injection control system for an engine as set forth in claim 26, wherein said reference crank angle position is set at a position immediately in front of a crank angle position where a suction stroke of said engine is started.

28. A fuel injection control system for an engine as set forth in claim 26, wherein said reference crank angle position is set at a position near a crank angle position where a suction stroke of said engine is finished.

* * * * *